United States Patent
Schlipf

(10) Patent No.: US 10,384,213 B2
(45) Date of Patent: Aug. 20, 2019

(54) APPARATUS AND METHOD FOR SEPARATING PARTICLES FROM A WASTE AIR STREAM OF A COATING BOOTH

(71) Applicant: Eisenmann SE, Boeblingen (DE)

(72) Inventor: Michael Schlipf, Goeppingen (DE)

(73) Assignee: EISENMANN SE, Boeblingen (DE)

(*) Notice: Subject to any disclaimer, the term of this patent is extended or adjusted under 35 U.S.C. 154(b) by 1 day.

(21) Appl. No.: 14/972,437

(22) Filed: Dec. 17, 2015

(65) Prior Publication Data
US 2016/0175873 A1 Jun. 23, 2016

(30) Foreign Application Priority Data
Dec. 17, 2014 (DE) .......................... 10 2014 018 903

(51) Int. Cl.
*B05B 14/44* (2018.01)
*B03C 3/41* (2006.01)
(Continued)

(52) U.S. Cl.
CPC .............. *B03C 3/04* (2013.01); *B01D 53/323* (2013.01); *B03C 3/017* (2013.01); *B03C 3/019* (2013.01); *B03C 3/08* (2013.01); *B03C 3/12* (2013.01); *B03C 3/41* (2013.01); *B03C 3/47* (2013.01); *B05B 14/42* (2018.02); *B05B 14/44* (2018.02); *B05B 14/46* (2018.02); *B05B 14/48* (2018.02); *B01D 2257/704* (2013.01);
(Continued)

(58) Field of Classification Search
CPC combination set(s) only.
See application file for complete search history.

(56) References Cited

U.S. PATENT DOCUMENTS 4,308,038 A * 12/1981 Michel ...................... B03C 3/15
                                                                  261/112.1
4,388,089 A *  6/1983 Reif ......................... B03C 3/16
                                                                  261/112.1
(Continued)

FOREIGN PATENT DOCUMENTS

AT        377 203            2/1985
DE        85 21 209 U1       4/1986
(Continued)

*Primary Examiner* — Amber R Orlando
*Assistant Examiner* — Sonji Turner
(74) *Attorney, Agent, or Firm* — Schroeder Intellectual Property Law Group, LLC

(57) ABSTRACT

An apparatus for separating particles from an air stream, the apparatus having an inlet region for the waste air stream, an outlet region for the waste air stream, a separating device arranged along the waste air stream, and at least one electrode arrangement which is connected to a high voltage source, wherein a charging region having one or more electrodes is provided to form a layer enriched with electrical charges, and wherein a separating region having separating surfaces is provided, which is subordinate to the charging region. The invention also relates to a method for separating particles from the waste air stream of a coating booth, wherein the waste air stream through a charging region in which particles of the waste air stream are charged, and the waste air stream after leaving the charging region flows through a separating region in which charged particles are deposited on separating surfaces.

15 Claims, 4 Drawing Sheets

(51) Int. Cl.
  *B03C 3/04* (2006.01)
  *B01D 53/32* (2006.01)
  *B03C 3/017* (2006.01)
  *B03C 3/019* (2006.01)
  *B03C 3/08* (2006.01)
  *B03C 3/12* (2006.01)
  *B03C 3/47* (2006.01)
  *B05B 14/42* (2018.01)
  *B05B 14/48* (2018.01)
  *B05B 14/46* (2018.01)
  *B05B 13/04* (2006.01)

(52) U.S. Cl.
  CPC .. *B01D 2258/0258* (2013.01); *B03C 2201/10* (2013.01); *B05B 13/0431* (2013.01)

(56) References Cited

U.S. PATENT DOCUMENTS

| | | | | |
|---|---|---|---|---|
| 4,505,724 | A * | 3/1985 | Baab | H01J 29/327 96/44 |
| 4,529,418 | A * | 7/1985 | Reif | B03C 3/53 261/112.1 |
| 6,238,459 | B1 * | 5/2001 | Downs | D21C 11/066 261/DIG. 54 |
| 8,465,575 | B2 * | 6/2013 | Tanaka | B03C 3/47 96/27 |
| 8,945,288 | B2 | 2/2015 | Swoboda et al. | |
| 8,974,579 | B2 * | 3/2015 | Swoboda | B03C 3/025 118/326 |
| 9,073,079 | B2 * | 7/2015 | Schulze | B03C 3/017 |
| 9,089,867 | B2 * | 7/2015 | Link | B03C 3/013 |
| 9,126,221 | B2 * | 9/2015 | Link | B03C 3/08 |
| 9,308,537 | B2 * | 4/2016 | Krichtafovitch | B03C 3/09 |
| 2007/0122320 | A1 * | 5/2007 | Pletcher | B03C 3/011 422/186.07 |
| 2011/0203459 | A1 | 8/2011 | Swoboda et al. | |
| 2013/0032088 | A1 | 2/2013 | Schulze et al. | |
| 2017/0021363 | A1 * | 1/2017 | Krichtafovitch | B03C 3/08 |

FOREIGN PATENT DOCUMENTS

| | | |
|---|---|---|
| DE | 10 2008 046 414 A1 | 3/2010 |
| DE | 10 2009 006 528 A1 | 7/2010 |
| DE | 10 2009 058 208 A1 | 6/2011 |
| DE | 10 2012 009 723 A1 | 11/2013 |
| EP | 2 664 388 A2 | 11/2013 |
| JP | 05023614 A * | 2/1993 |
| KR | 101436293 B1 * | 9/2014 |

* cited by examiner

APPARATUS AND METHOD FOR SEPARATING PARTICLES FROM A WASTE AIR STREAM OF A COATING BOOTH

RELATED APPLICATIONS

This application claims the filing benefit of German Patent Application No. 10 2014 018 903.1, filed Dec. 17, 2014, the contents of which are incorporated herein by reference.

FIELD OF THE INVENTION

The invention relates to an apparatus for separating particles from a waste air stream, with an inlet region for the waste air stream, with an outlet region for the waste air stream, with a separating device that is arranged along the waste air stream, and with at least one electrode arrangement that is connected to a high voltage source.

The invention also relates to a method for separating particles from the waste air stream of a coating booth.

BACKGROUND OF THE INVENTION

From DE 10 2008 046 414 A1 an apparatus is known for separating paint overspray from the booth waste air loaded with overspray from paint shops, which apparatus includes at least one separating surface along and over which the booth waste air can be led and which is connected to one pole of a high voltage source, wherein an electrode device arranged in the waste air stream is associated with the separating surface and is connected to the other pole of the high voltage source.

DE 10 2012 009 723 A1 describes a further apparatus for separating paint overspray from the booth waste air loaded with overspray from paint shops, with separating means along and over which the booth waste air can be led and which are at the potential of one pole of a high voltage source, with an electrode device arranged in the waste air stream that is connected to the other pole of the high voltage source, and with a device by means of which at least one free-falling separating curtain can be generated from a separating material that serves as separating means and cooperates with the electrode device.

SUMMARY OF THE INVENTION

An object of the present invention is to provide an apparatus and a method for separating particles, in particular overspray, from the waste air stream of a coating booth, that are more developed compared to the prior art.

This object may be achieved by an apparatus of the type mentioned in the introduction with a charging region that comprises one or more electrodes for forming a layer enriched with electrical charges, and with a separating region that comprises separating surfaces and is subordinate to the charging region. In this way a spatial separation of the electrodes from the separating region is achieved. An apparatus for separating particles is thus made available, whose construction is more favourable than the prior art in terms of commissioning, servicing, cleaning and maintenance. The advantages resulting from this relate for example to the cleaning and the replacement of electrodes in the charging region and/or of parts of the separating device in the separating region, wherein a cleaning and a replacement can be performed independently of the respective other region of the apparatus. On account of the fact that it is possible according to the invention to dispense with the provision of electrodes in the separating region, the efficiency of the separation can be improved, for example by the provision of larger and/or a larger number of separating surfaces. The apparatus according to the invention is characterised by a very low susceptibility to failure.

Advantageously the layer of the charging region enriched with electrical charges can be formed so that it covers at least substantially the separating region. In this way a particularly large proportion of the particles present in the air stream are electrically charged with a high degree of reliability even before the air stream enters the separating region.

For example, in order to further reduce further the susceptibility of the apparatus to failure, it may be expedient to arrange the one or more electrodes in several electrode levels.

Preferably one or more electrodes of a first electrode level can extend substantially along a first direction, wherein one or more electrodes of a second electrode level can extend substantially along a second direction that differs from the first direction. In this way the charging of the particles in the air stream can be further improved.

For example, in order to keep the contamination of the electrode arrangement as low as possible, it may be advantageous if the first electrode level and the second electrode level are arranged spaced from one another.

It may also be expedient to provide at least one first high voltage source that is associated with the first electrode level, and at least one second high voltage source that is associated with the second electrode level. In this way a system redundancy can be made available, which increases the operational security.

With regard to a construction that is as simple and robust as possible, it may expedient if the first electrode level and the second electrode level are formed so as to touch one another.

In order to further improve the efficiency and reliability of the charging of the particles present in the air stream in the charging region, it may be advantageous if at least one of the electrodes has a plurality of tips, the tips projecting at least partially from the electrode level in which the at least one electrode extends.

Preferably the electrodes can be formed as modular units that can be removed from the apparatus. In this way a more favourable cleaning is made possible for example, whereby the electrodes can be cleaned in the removed state.

As regards the handling of the electrode arrangement, for example for cleaning and/or maintenance, or with regard to the charging of particles in the charging region, it may be advantageous if the electrodes form a lattice-shaped arrangement.

For example, in order to improve the operational security and achieve a mode of operation that is as needs-based as possible, it may be expedient if the charging region comprises a plurality of partial sections, wherein for a partial section at least one high voltage source is provided in each case.

The object mentioned above may also be achieved by a plant for coating objects by means of a coating booth and with a plant region adjacent to the coating booth, wherein the coating booth has an opening through which a waste air stream of the coating booth can be fed to the adjoining plant region, and wherein an apparatus according to the invention or one of its modifications is arranged in the said adjoining plant region. Such a plant is characterised by a low failure susceptibility and an improved operation.

Advantageously the coating booth is a paint spraying booth for vehicle bodies.

With regard to a needs-based and functionally reliable operation of the plant it may expedient if the plant comprises a plurality of partial sections with which are associated respectively partial sections of the charging region, wherein in each case at least one high voltage source is provided for a partial section of the charging region.

The invention is also achieved by a method for separating particles from the waste air stream of a coating booth, wherein the waste air stream is first of all led through a charging region that is traversed by electrodes and in which a charging of particles of the waste air takes place, and wherein the waste air stream is then passed through a separating region in which particles of the waste air are separated and deposited on separating surfaces. The advantages of the method according to the invention result in particular in a similar way to the advantages of the apparatus according to the invention.

Further advantageous modifications follow from the following description.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

In this, exemplary embodiments of the invention, without however being restricted thereto, are described in more detail with the aid of the drawings, which show, in each case in a simplified, schematic representation.

DETAILED DESCRIPTION OF THE PRESENT INVENTION

Figure 1:
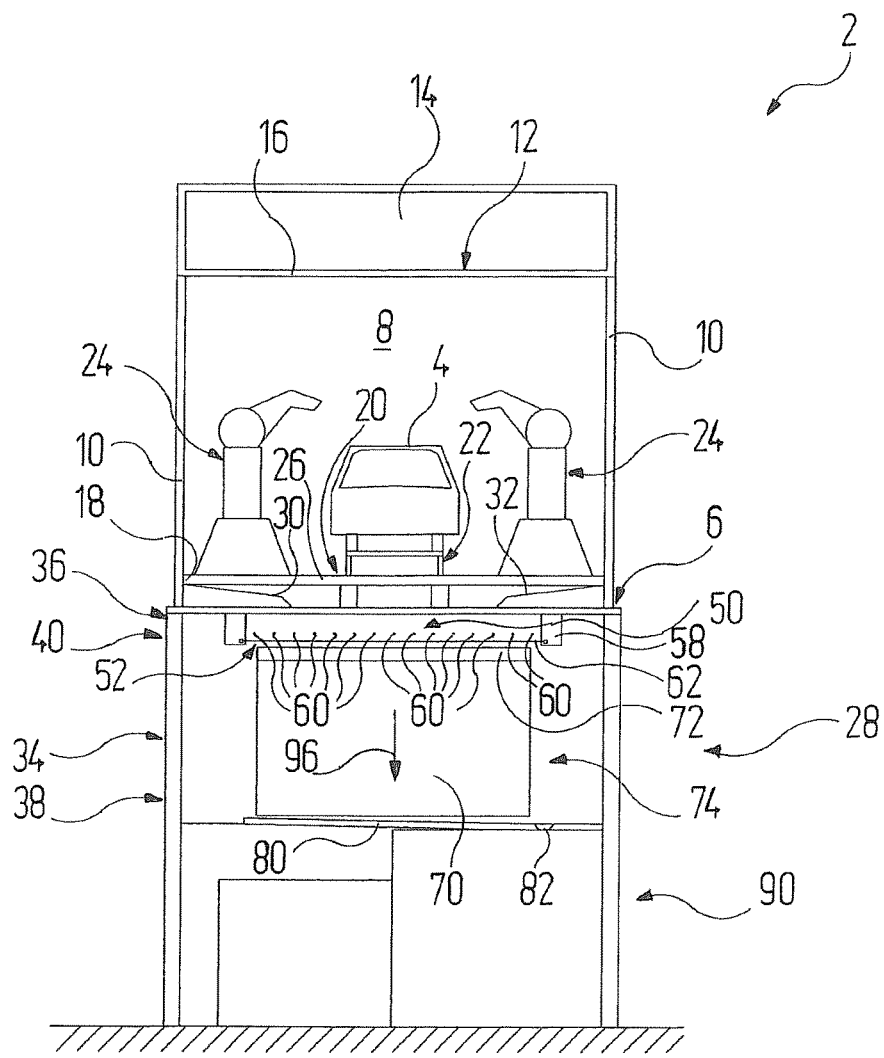
FIG. 1 a front view of a paint spraying booth of a surface treatment plant with an apparatus for separating overspray.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
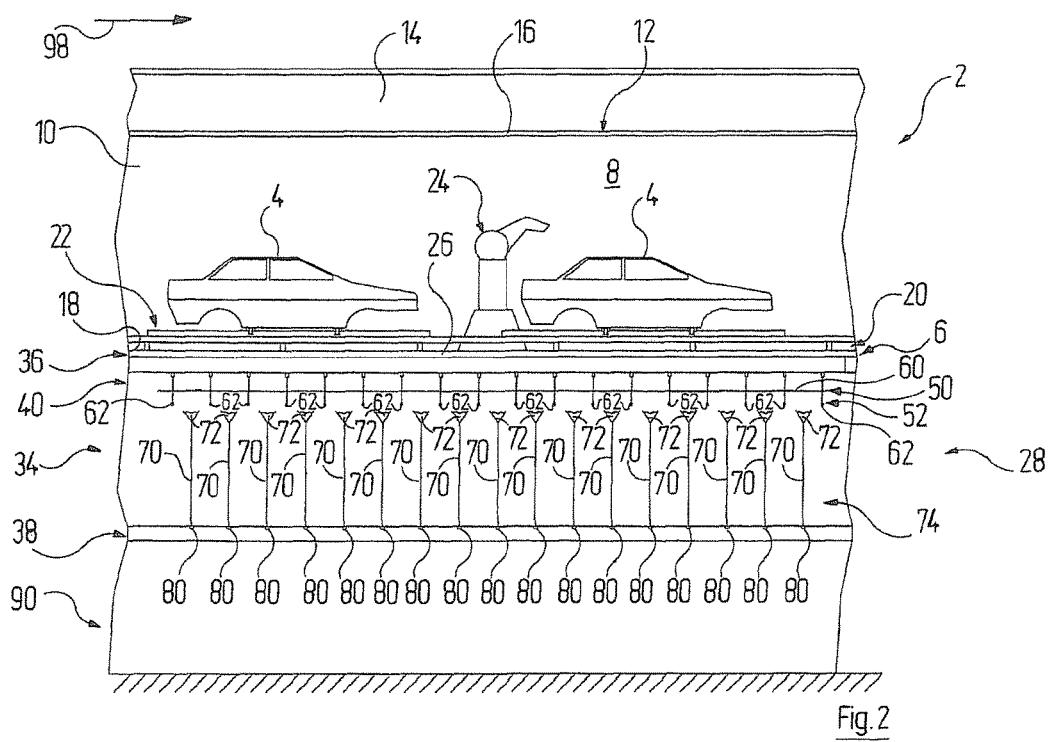
FIG. 2 a section of a side view of a paint spraying booth of a surface treatment plant with an apparatus for separating overspray.
Figure 3:
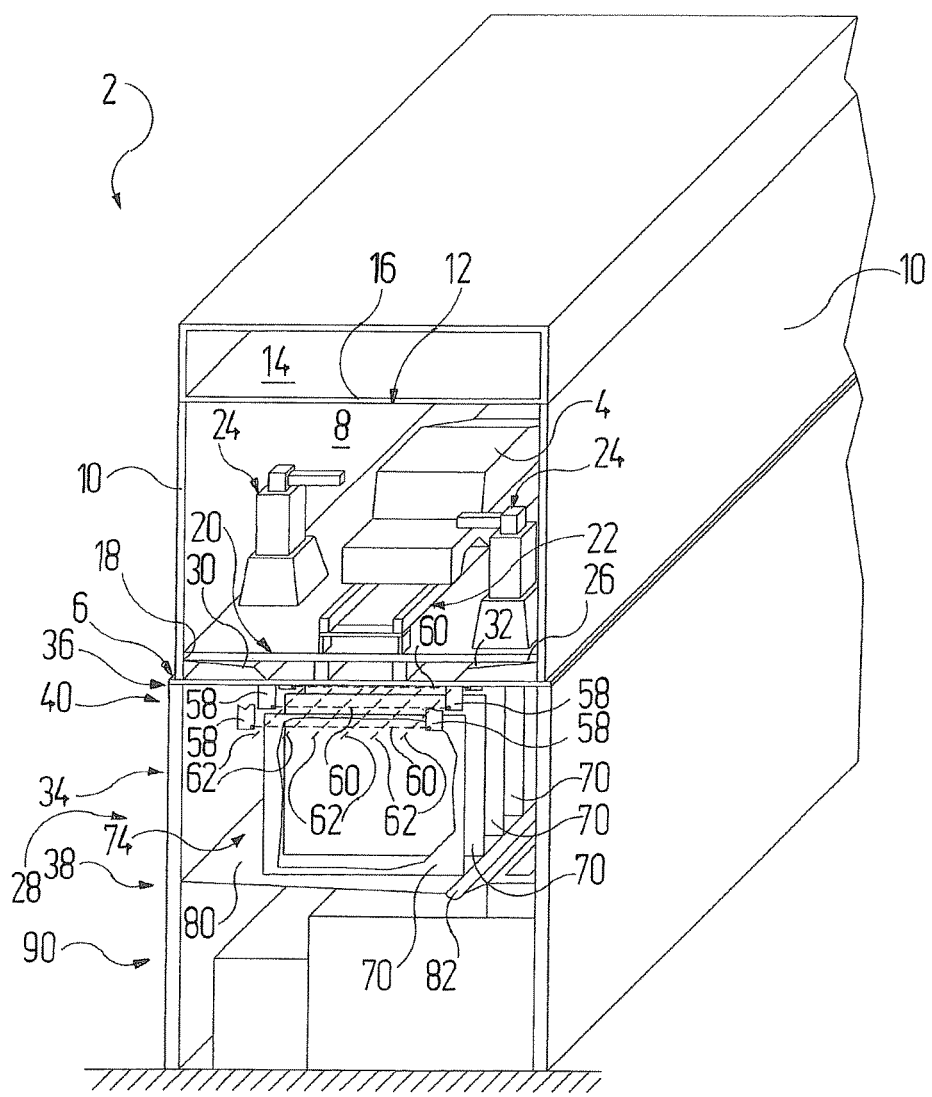
FIG. 3 a perspective partial view of a paint spraying booth of a surface treatment plant with an apparatus for separating overspray.

FIGS. 1 to 3 show a plant for coating objects with a coating booth 2. In the illustrated examples the coating booth 2 is designed as a paint spraying booth in which vehicle bodies 4 are coated with coating material in the form of paint. FIGS. 1 to 3 show a substructure 6 known per se, for example a steel structure, on which the paint spraying booth rests.

The coating booth 2 formed as a paint spraying booth has a paint spray tunnel 8 that is bounded laterally by walls 10 and above by a booth roof 12. The spray tunnel 8 can be formed open on its front sides, not shown in more detail, or can be provided with at least one airlock device. A lower opening 18 of the spray tunnel 8 is according to the illustrated examples covered by a grating 26, which can preferably be formed so as to be accessible.

In the illustrated examples a steel structure 20, above which is arranged a conveyor system 22, is provided on the lower opening 18 of the spray tunnel 8. With the aid of the conveyor system 22 vehicle bodies 4 to be painted can be conveyed from an inlet side of the spray tunnel 8 to an outlet side of the spray tunnel 8. FIG. 2 shows an example according to which the vehicle bodies 4 are moved by means of the conveyor system 22 in the direction of the arrow 98.

According to the examples illustrated in FIGS. 1 to 3 application devices are located in the interior of the spray tunnel 8, which in the present case are shown in the form of application robots 24 and by means of which the vehicle bodies 4 can be coated for example with paint. The paint can be automatically applied by means of the application robots 24.

As a rule, in the manual or automatic application of paints to objects a partial stream of the paint, which generally contains solids and/or binders as well as solvents, is not applied to the object. This partial stream is termed overspray.

According to the examples illustrated in FIGS. 1 to 3 the booth roof 12 forms the lower boundary of an air feed space 14 and is formed as a filter roof 16. Air, preferably treated air, flows via the air feed space 14 as booth air from above into the spray tunnel 8. The spray tunnel 8 is arranged above a plant region 28 and is downwardly open in such a way that booth waste air can flow downwards and can enter the plant region 28 as a waste air stream. The lower opening 18 of the spray tunnel is accordingly formed so as to be air-permeable, in which connection a suitable covering of the opening 18 can be provided, for example the grating 26 illustrated in the examples.

The air when flowing through the spray tunnel 8 picks up particles, in particular overspray or overspray particles. Such particles are removed from the spray tunnel 8 with the waste air stream. In the illustrated examples the booth waste air loaded with overspray flows from the paint spray booth as a waste air stream downwardly into the plant region 28.

In the plant region 28 arranged underneath the coating booth 2 particles entrained by the booth air in the waste air stream are separated from the booth air. The overspray collected by the air stream in the spray booth is fed in the plant region 28 to a separation unit so that after suitable treatment the air can optionally be recycled at least partially to the coating booth 2.

The waste air stream fed from the coating booth 2 to the plant region 28 first of all enters an inlet region 36. A charging region 40 subordinate to the inlet region 36 in the flow direction is provided. In turn, a separating region 34 subordinate in the flow direction is provided. An outlet region 38 subordinate to the separating region 34 in the flow direction is also provided. The flow direction of the waste air stream is indicated in FIG. 1 by the arrow 96.

In the charging region 40, through which the waste air stream flows before reaching the separating region 34, particles present in the waste air are electrically charged. In the subordinate separating region 34 particles are separated from the waste air in a separating device 74.

In the separating region 34 the waste air stream is fed over and along the separating surfaces 70. On the separating surfaces 70 particles can be separated from the waste air stream on a separating agent, such as for example water.

Suitable separating surfaces 70 of a separating device 74, on which particles of the waste air can be separated, are illustrated in FIGS. 1 to 3.

The separating surfaces 70 can be formed for example as lateral surfaces of separating units, not shown in more detail. In this connection the separating surfaces 70 can for example be provide on side plates of such separating units. Preferably wetting agents can be provided for the separating surfaces 70, with the aid of which the separating surfaces 70 can be wetted with a separating agent. For example, one or more delivery channels 72 (see FIGS. 1 and 2) associated with the delivery surfaces 70 can be provided for delivering a separating fluid. In order to drain particles from the separating surfaces 70 the separating fluid can flow off from the separating surfaces 70.

Alternatively, or in addition, separating surfaces 70 can be formed in the manner of a curtain of separating material, in which the separating material is delivered from a delivery channel 72 (see FIGS. 1 and 2). A delivery channel 72 can in this connection be provided with an outlet slit, not shown in more detail, through which the separating material can escape downwardly.

In principle liquids as well as solids or mixtures thereof can be used as separating material. In the case of a liquid separating material, such as for example water, or a mixture of liquid and solids, a coherent liquid film is preferably produced as illustrated in FIG. 2. In the case of a solid separating material measures must be adopted so that the separating surfaces 70 can be impacted by a largely coherent solids layer.

A collecting channel 82 (see FIGS. 1 and 3) may be provided for the removal of separated material from the separating region 34. In addition, suitable collecting means 80 (see FIGS. 1 to 3) for separating material and/or separating liquid may be provided underneath the separating surfaces 70. The collecting means 80 can be formed for example as one or more collecting channels. Collected separating material and/or collected separating liquid as well as separated particles entrained therewith can be discharged for example by means of the collecting channel 82.

FIGS. 1 to 3 show a charging region 40, which comprises an electrode arrangement with one or more electrodes 60, 62 for forming a layer enriched with electrical charges. The charging region 40 is in this connection formed spatially separated from the separating region 34. The examples show that no electrodes 60, 62 are arranged between the separating surfaces 70 of the separating region 34.

The electrodes 60, 62 are connected to one or more high voltage sources, in which connection for the sake of clarity these high voltage sources are not shown in more detail in the drawings. The electrodes 60, 62 are preferably formed as negative discharge electrodes. The electrodes 60, 62 connected to the pole of a high voltage source can for example have a high voltage in the range from circa 20 kV to circa 80 kV, for example about 45 kV. Electrodes 60, 62 subject to the high voltage form a corona discharge, in which particles are charged.

An effective ionisation of the particles, for example overspray, present in the waste air stream takes place in the vicinity of the electrodes 60, 62. The ionisation of the particles takes place here in the electrostatic field of a corona discharge or corona cloud surrounding the electrodes 60, 62.

In the charging region 40 a layer is formed by means of the electrodes 60, 62, in which the particles of the waste air stream are charged. The charging takes place for example by field charging or by diffusion charging, caused by the accretion of negative charges when these collide with the particles. The charged particles leave the charging region 40 and migrate with the waste air stream to the separating region 34.

The waste air stream entering the separating region 34 has previously flowed through the layer in the charging region 40 enriched with electrical charges by means of the electrodes 60, 62. A charging of the particles in the waste air stream takes place according to the illustrated examples in the charging region 40 at least substantially even before the particles reach the separating region 34.

An earth potential exists in parts of the separating region 34, the separating surfaces 70 preferably being at earth potential. Charged particles give up their charge in the separating region 34 and are bound to the separating surfaces 70 by adhesive forces.

In the apparatus for separating particles illustrated in the examples according to FIGS. 1 to 3, the active elements are arranged in the charging region 40 and the passive elements in the separating region 34. In this connection the electrodes 60, 62, which are under a high voltage, form the active elements, while the earthed separating surfaces 70 form the passive elements.

Owing to the separation procedure being apart from the high voltage and the arrangement of the passive elements underneath the active elements, a robust and technologically advantageous mode of construction is provided, which is only slightly susceptible to failure. The provision of a locking air channel can optionally be omitted in such a construction.

The electrodes 60, 62 are as illustrated in FIGS. 1 to 4 arranged in one or more electrode levels 50, 52. The electrode levels 50, 52 are recognisable in FIG. 3, but for the sake of clarity are not provided with reference numerals however. The electrodes 60, 62 can for example be designed in the form of wires. Preferably the electrodes 60, 62 extend longitudinally in at least one electrode level 50, 52. The electrodes 60, 62 of an electrode level 50, 52 can for example be arranged at equal distances with respect to one another.

The direction in which the electrodes 60 in a first electrode level 50 are aligned can differ from the direction in which the electrodes 62 in a first electrode level 52 are aligned. In this way the electrodes 60, 62 can form a grid-shaped arrangement. The aforementioned directions can for example be arranged at an angle of 90° with respect to one another.

Different electrode levels 50, 52 can be arranged spaced apart and/or overlapping one another, in which connection they can optionally touch one another. If the electrodes 60, 62 of different electrode levels 50, 52 do not touch or contact one another, they can be coupled to separate high voltage sources, see for example voltage sources 53a, 53b in FIG. 4. Alternatively, a coupling to a common high voltage source may also be envisaged.

Partial sections with a high voltage supply defined in each case section by section may be provided. Such partial sections may be provided for example along a paint tunnel. Such partial sections can be arranged in a plant with a coating booth 2 for example along the direction of the material or arrow 98 (see FIG. 2).

The electrodes 60, 62 can be formed for example as elements extending at least substantially rectilinearly. Advantages in the charging can be achieved if one or more electrodes 60, 62 have one or more tips. Preferably such tips can project at least partially from an electrode level 50, 52, wherein the tips may for example be pin-shaped. Such tips can for example also be formed by electrodes whose shape resembles a saw-tooth. A further possibility for forming tips of an electrode 60, 62 is illustrated in FIG. 4 in a highly schematic representation with the example of the electrode 60.

Figure 4:
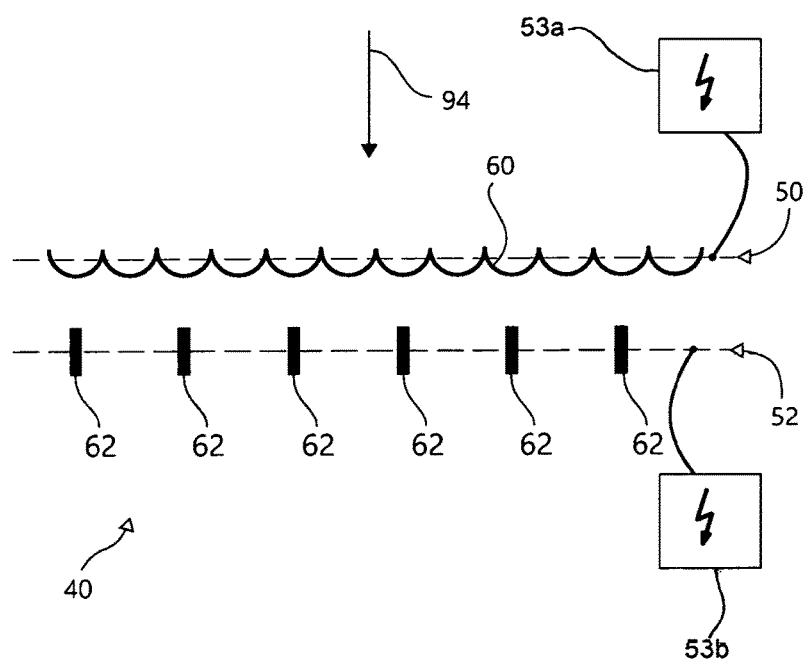
FIG. 4 a highly simplified and sectional front view of an electrode arrangement of an apparatus for separating overspray.

FIG. 4 shows electrodes 60, 62, which extend substantially in two electrode levels 50, 52 arranged above one another and spaced apart from one another. In the example illustrated in FIG. 4 the tips of the electrode 60 arranged substantially in the upper level 50 are aligned against the waste air stream, wherein the waste air stream according to FIG. 4 flows in the direction of the arrow 94 through the charging region 40. Alternatively, or in addition tips for example can be provided that are aligned with the waste air stream, i.e. in the direction of the arrow 94.

In the examples that are illustrated in FIGS. 1 to 3, the waste air in the plant region 28 moves from the inlet region 36 to the outlet region 38. Air guide devices may be provided to lead the waste air stream into, through and out of the plant region 28. FIGS. 1 and 3 show for example air guide devices that are formed as downwardly converging air baffle plates 30, 32, in order to guide the waste air stream in the direction towards and through the plant region 28.

Preferably one or more holding devices 58 (see FIGS. 1 and 3) can be provided for the electrodes. For the sake of clarity, in FIG. 1 only one of the holding devices 58 arranged symmetrically in the illustrated example is provided with a reference numeral. The at least one holding device 58 is preferably arranged at least substantially outside the waste air stream. Accordingly, the one or more holding devices 58 can for example be arranged covered by the air baffle plates 30, 32. The holding devices 58 can preferably be designed so that the electrodes 60, 62, which can be designed in the form of modules or modular units, can easily be removed for cleaning and can preferably also be easily reinserted. The electrodes 60, 62 can conveniently be inserted or held as grid-shaped modules in the at least one holding device 58.

According to the examples illustrated in FIGS. 1 to 3 the plant region 28 can comprise an air treatment region 90, into which the waste air stream passes after leaving the outlet region 38. One or more filters are also optionally provided in the air treatment region 90, in order to remove for example possible residual particles or overspray residues or other impurities from the waste air stream. The purified booth air can in this case be at least partially treated so that it can be recycled to the air feed space 14, from where it can flow again into the paint spray tunnel 8. In addition, or alternatively the air feed space 14 can also be fed with external air or fresh air.

A concept on which the invention is based can be summarised as follows: the present invention relates to an apparatus for separating particles from a waste air stream, wherein the apparatus comprises an inlet region 36 for the waste air stream, an outlet region 38 for the waste air stream, a separating device 74 arranged along the waste air stream, and at least one electrode arrangement, which electrode arrangement is connected to a high voltage source, wherein a charging region 40 is provided that comprises one or more electrodes 60, 62 for forming a layer enriched with electrical charges, and wherein a separating region 34 comprising separating surfaces 70 is provided, which is subordinate to the charging region 40. The invention also relates to a method for separating particles from the waste air stream of a coating booth 2, wherein the waste air stream is first of all led through a charging region 40 in which a charging of particles of the waste air takes place, and wherein the waste air stream after leaving the charging region 40 flows through a separating region 34, in which charged particles of the waste air are deposited on separating surfaces 70. The advantages according to the invention relate to an improved commissioning, servicing, cleaning or maintenance as well as a reduced susceptibility to failure.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An apparatus for separating particles from a waste air stream comprising:
   (a) an inlet region for the waste air stream,
   (b) an outlet region for the waste air stream,
   (c) a separating region that is arranged along the waste air stream,
   (d) at least one electrode arrangement that is connected to a high voltage source is provided in a charging region, the at least one electrode arrangement comprising one or more electrodes for forming a layer enriched with electrical charges,
   wherein
   (e) the separating region comprises a plurality of separating surfaces wherein no electrodes are arranged between adjacent separating surfaces from the plurality of separating surfaces and the plurality of separating surfaces are vertically spaced apart from and aligned beneath the charging region.

2. The apparatus according to claim 1, wherein the layer of the charging region enriched with electrical charges is formed so as to at least substantially cover the separating region.

3. The apparatus according to claim 1, wherein the one or more electrodes is/are arranged in several electrode levels.

4. The apparatus according to claim 3, wherein the one or more electrodes of a first electrode level extend substantially along a first direction and that the one or more electrodes of a second electrode level extend substantially along a second direction that is different from the first direction.

5. The apparatus according to claim 3, wherein the first electrode level and the second electrode level are arranged spaced from one another.

6. The apparatus according to claim 5, wherein at least one first high voltage source is provided, which is associated with the first electrode level, and that at least one second high voltage source is provided, which is associated with the second electrode level.

7. The apparatus according to claim 4, wherein the first electrode level and the second electrode level touch one another.

8. The apparatus according to claim 1, wherein at least one electrode from the one or more electrodes has a plurality of tips, which tips project at least partially from an electrode level in which the at least one electrode extends.

9. The apparatus according to claim 1, wherein the one or more electrodes are formed as modular units that can be removed from the apparatus.

10. The apparatus according to claim 1, wherein the one or more electrodes form a grid-like arrangement.

11. The apparatus according to claim 1, wherein the charging region has a plurality of partial sections, wherein for a partial section at least one high voltage source is provided in each case.

12. The apparatus according to claim 1 further comprising at least one delivery channel, the at least one delivery channel being provided at one end a separating surface from the plurality of separating surfaces and delivering a separating fluid to the separating surface.

13. The apparatus according to claim 12 wherein the at least one delivery channel is located between the separating surface and the charging region.

14. The apparatus according to claim 4 wherein the first electrode level and second electrode level form a grid.

15. The apparatus according to claim 4 wherein the first electrode level and second electrode level extend rectilinearly.

* * * * *